Jan. 26, 1943.  C. A. BICKEL  2,309,298
TAPER ATTACHMENT CONSTRUCTION
Filed June 10, 1940  3 Sheets-Sheet 1

INVENTOR
CLIFFORD A. BICKEL
BY
ATTORNEYS

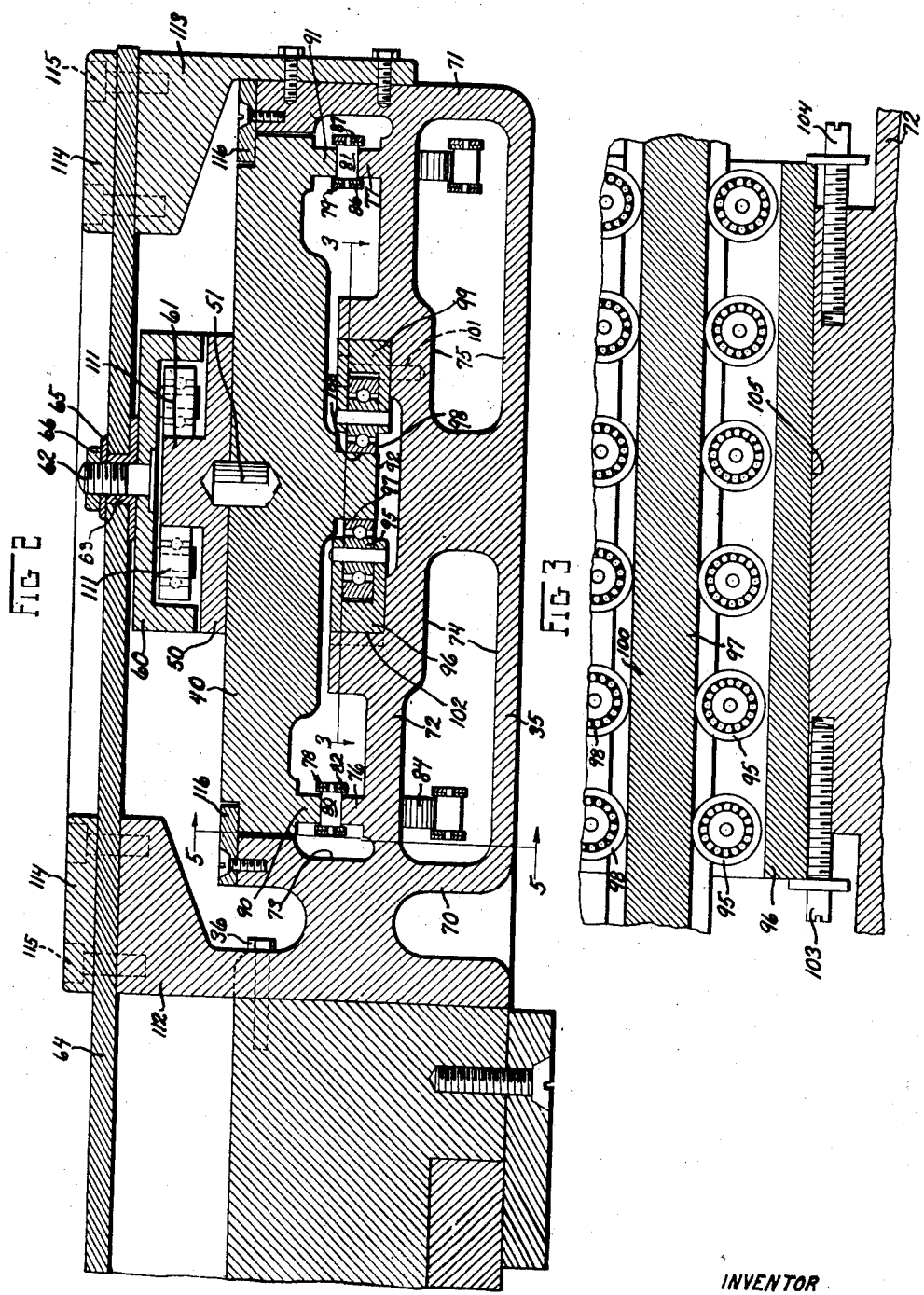

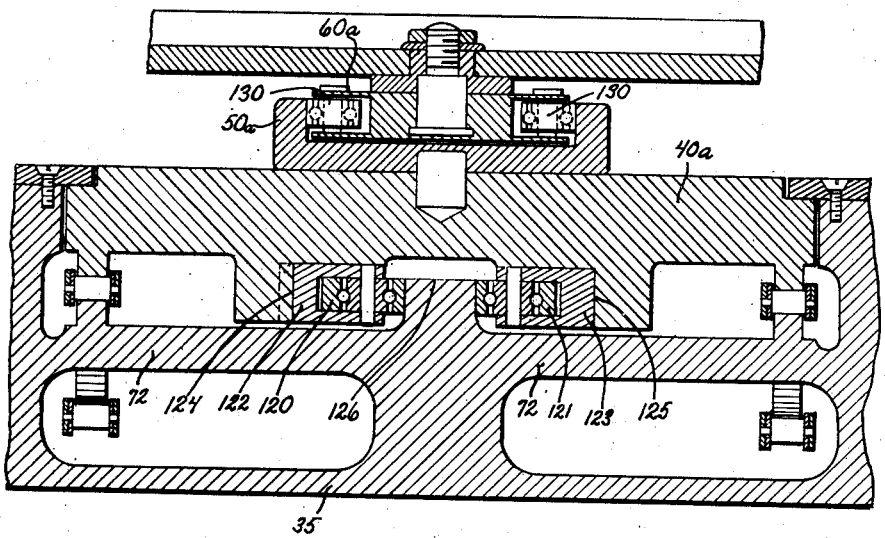
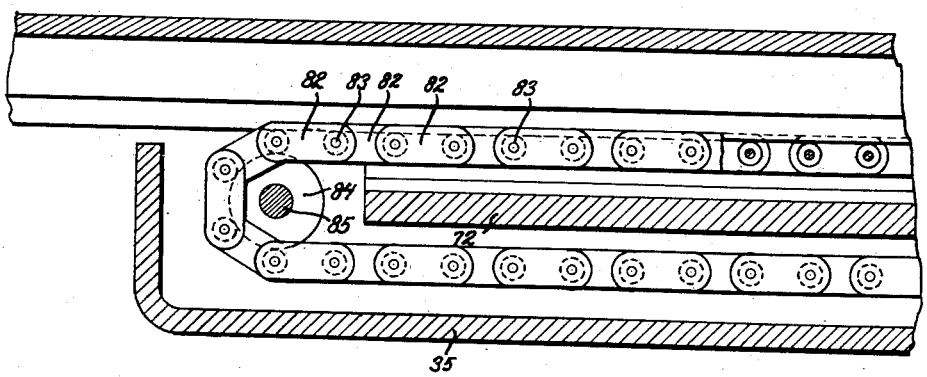

Patented Jan. 26, 1943

2,309,298

UNITED STATES PATENT OFFICE 2,309,298

TAPER ATTACHMENT CONSTRUCTION

Clifford A. Bickel, Sidney, Ohio, assignor to The Monarch Machine Tool Co., Sidney, Ohio, a corporation of Ohio Application June 10, 1940, Serial No. 339,686

2 Claims. (Cl. 82—17)

This invention relates to taper cutting devices for use in combination with a lathe or other turning machine.

An object of the invention is to provide a taper cutting device wherein a movable slide member is positioned upon a plurality of roller bearings to reduce the friction of the movement between the slide and carriage bracket upon which the slide is mounted.

A further object of the invention is to provide a continuous chain of roller bearings and to position the chains between the slide and carriage bracket of a taper cutting device.

Another object of the invention is to provide means to longitudinally guide a plurality of lineally interconnected roller bearings.

Another object of the invention is to provide a taper cutting device wherein the slide is supported upon a plurality of lineally interconnected roller bearing elements which absorb vertical thrust of the slide with respect to a carriage bracket upon which the slide is mounted, and wherein a plurality of roller bearing elements are positioned between the slide and carriage bracket in such a manner as to absorb transverse thrust of the slide.

Another object of the invention is to provide a combination of roller bearings and ball bearings within a taper cutting device in such a manner that the roller bearings absorb vertical thrusts while the ball bearings absorb lateral thrusts.

Further objects and advantages will be apparent from the drawings and the description which follows.

In the drawings:

Figure 2 is a cross-sectional view of the taper cutting device taken along line 2—2 of Figure 1;

Figure 3 is a horizontal cross-sectional view taken along line 3—3 of Figure 2, showing the longitudinal guideway and bearing members for a movable slide of the taper cutting device;

Figure 4 is a transverse cross-sectional view similar to Figure 2 but showing a modified arrangement of the positioning of the bearing elements of the device;

Figure 5 is a vertical cross-sectional view taken along line 5—5 of Figure 2 showing a continuous chain of roller type anti-friction bearings.

Figure 1:
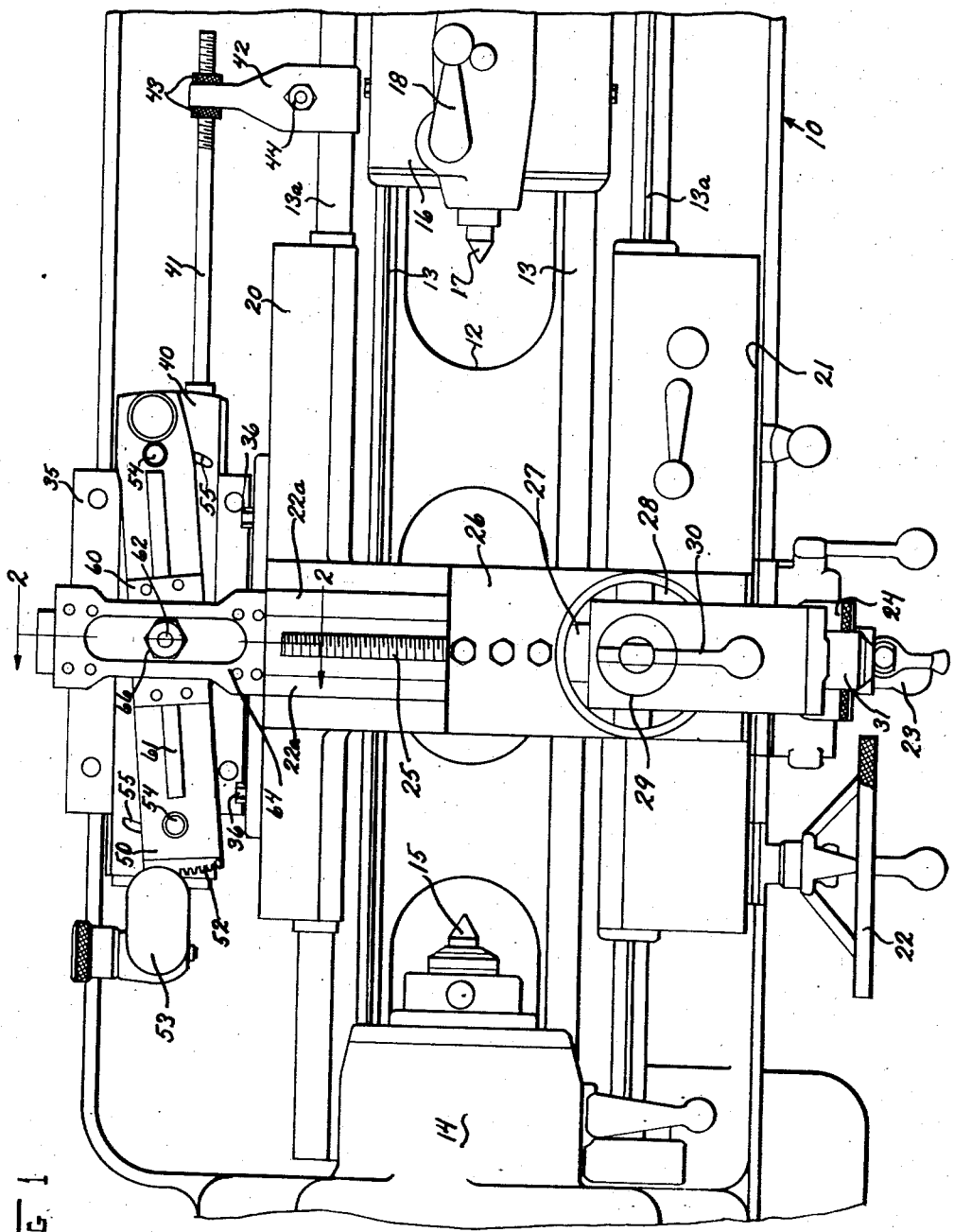
Figure 1 is a plan view of a lathe upon which a taper cutting device, having features of this invention, is attached.

In general, the device of this invention is used to control the cutting of a taper upon a rotating piece within a lathe. The device consists of a carriage bracket which is adapted to be secured to the carriage positioned upon the lathe or turning machine. This carriage bracket is moved longitudinally to and fro along the ways of the lathe when the carriage of the lathe is operated. A slide member is positioned upon the carriage bracket, upon suitable anti-friction bearing devices, and is adapted to be retained in a stationary position with respect to the bed of a lathe by means of a suitable anchoring device. A swivel member is pivotally mounted upon the slide and is arranged to be positioned at an angle with respect to the axis of rotation of the workpiece in the lathe. A shoe engages the swivel member and is carried by suitable means upon the carriage bracket and is moved longitudinally with respect to the swivel member when the carriage bracket is moved longitudinally with the carriage of the lathe. The shoe is interconnected with the cross-feed screw or the cross-slide of the lathe in such a manner that the angular movement of the shoe, with respect to the axis of rotation of the workpiece in the lathe, will be transmitted to the cross-feed screw and cross-slide simultaneously with longitudinal movement of the carriage of the lathe, thereby cutting a taper on a workpiece positioned in the lathe. To reduce the friction between the moving parts of the taper cutting device to a minimum the anti-friction bearing devices of this invention are interposed between the various moving elements of the taper cutting device.

In this invention the taper cutting device is shown as being applied to use upon a lathe 10. The lathe 10 is provided with a bed 12 upon the upper surface of which there are provided the ways 13. At one end of the bed 12 of the lathe 10 there is mounted a head stock 14 within which there is provided the usual and conventional driving means for rotating a live spindle 15. At the opposite end of the lathe there is provided a tail stock 16 which is mounted upon the ways 13 to permit longitudinal movement of the tail stock 16 to and fro along the ways. The tail stock 16 carries a dead center 17 which is adapted to be clamped into position in any conventional manner as by the hand lever 18. A hand lever (not shown) is also provided to cause the tail stock 16 to be clamped into position upon the ways 13. A carriage 20 is positioned upon the lathe bed 12 and is adapted to be mounted upon the ways 13a to permit longitudinal movement of the carriage 20 to and fro along the ways 13a by suitable drive mechanism. An apron 21 depends from the carriage 20 along the front portion of the lathe 10 and is adapted to have mounted thereupon suitable controls for controlling the operation of the carriage 20 and the cross-feed screw 25. These controls may consist of a hand wheel 22 which engages a feed rack (not shown) to cause movement of the carriage 20 to and fro along the ways 13a. A hand wheel 23 may be provided for controlling the operation of the cross-feed screw 25, which screw can also be driven from a feed rod (not shown). A suitable micrometer head 24 may be positioned upon the controlling device for the cross-feed screw 25 to indicate the movement thereof.

A cross-slide 26 is mounted upon the carriage 20 and is directed in its transverse movement upon the carriage 20 by means of the ways 22a. A conventional type dovetail joint is provided between the cross-slide 26 and the ways 22a. Mounted upon the cross-slide 26 there is a compound tool rest 27 which consists of a turntable 28 and a tool post 29. A suitable clamping device 30 is mounted upon the tool post 29 and is arranged to secure a working tool within the post 29 as well as to secure the post 29 to the turntable 28, thereby rigidly securing a tool upon the compound tool rest 27. A micrometer indicating head 31 may be arranged upon the compound tool rest 27 to control and indicate the movement of the tool rest.

The taper cutting device of this invention consists of a carriage bracket 35 which is secured to the carriage 20 by means of the bolts 36, whereby movement of the carriage 20 will cause the carriage bracket 35 to be moved therewith. A slide member 40 is positioned upon the carriage bracket 35 and is supported thereon by means of suitable anti-friction bearing devices hereinafter described. An anchor rod 41 is secured to one end of the slide 40 and extends through an anchor bracket 42. The anchor rod 41 is securely positioned within the anchor bracket 42 by the threaded nuts 43 which engage opposite sides of an extending arm of the anchor bracket 42. The anchor bracket 42 is secured to the way 13a by means of the binding nut 44 which engages a suitable clamp for securing the anchor bracket to the way 13a. A swivel 50 is pivotally mounted upon the slide 40 by means of a pin 51, see Figure 2, in such a manner that the swivel 50 may be positioned at an angle with respect to the axis of rotation of a workpiece positioned between the live center 15 and the dead center 17 of the lathe 10. One end of the swivel 50 is provided with a gear segment 52 which engages a micrometer adjusting device 53, operation of which controls the angular position of the swivel 50. Binding screws 54 extend through the swivel 50 into engagement with the slots 55 positioned in the slide 40 and cooperate therewith to secure the swivel 50 in its angular position upon the slide 40 after having been set by means of the micrometer adjusting device 53.

A shoe or follower 60 engages the swivel 50 and is guided in its longitudinal path of travel along the swivel 50 by means of a guide rail 61. The shoe 60 carries a stud 62 which extends upwardly through a bushing 63 in the draw-bar 64. A washer 65 is positioned upon the stud 62 above the draw-bar 64 and is adapted to be caused to engage the bushing 63 by means of a nut 66 threaded upon the end of the stud 62. The stud 62 and the bushing 63 provide the means for pivotally mounting the draw-bar 64 upon the shoe 60 to permit transverse motion of the shoe 60 to be transmitted through the draw-bar 64 when the shoe travels an angular longitudinal path along the guideway 61 of the swivel 50.

The draw-bar 64 is attached to the cross-feed screw 25 of the lathe 10 in such a manner that rotation of the cross-feed screw 25 is permitted. However, the method of attaching the draw-bar 64 to the cross-feed screw 25 is such that a direct transverse push or pull upon the cross-feed screw 25 by the draw-bar 64 will be transmitted directly to the cross-feed screw 25 regardless of rotation thereof. Many specific arrangements are possible for accomplishing the above mentioned attachment between the draw-bar 64 and the cross-feed screw 25, and for this reason it is not thought necessary to further describe a specific interconnection.

When the taper cutting device is placed in operation the carriage 20 upon the lathe 10 will be moving longitudinally along the ways 13a carrying the carriage bracket 35 and the shoe 60 therewith. The slide 40 and the swivel 50 will be retained in a stationary position with respect to the lathe, the anchor bracket 42 and the rod 41. Relative movement of these parts will cause the shoe 60 to follow an angular path of longitudinal travel upon the guideway 61 of the swivel 50. Since the shoe 60 is connected to the cross-feed screw 25 or the cross-slide 26 by means of the draw-bar 64, it is seen that the angular path of travel of the shoe 60 will be directly transmitted to a tool positioned within the tool post mounted upon the cross-slide 26.

To permit this transverse movement of the cross-slide 26 without rotation of the cross-feed screw 25 any conventional telescopic driving attachment between the cross-feed screw 25 and the lathe feed mechanism for the cross-feed screw may be provided. Since such arrangements are conventional further description and disclosure thereof is not believed necessary.

The taper cutting device of this invention consists of the carriage bracket 35 having upwardly extending longitudinally positioned walls 70 and 71. The walls 70 and 71 are interconnected by means of a substantially horizontal platform 72 which provides an upper recess 73 which extends longitudinally between the walls 70 and 71. Below the platform 72 there are provided cored passages 74 and 75. Upon the upper side of the platform 72 and adjacent the walls 70 and 71 upwardly extending runways 76 and 77 are positioned longitudinally thereupon. These runways 76 and 77 provide the roller bearing surface for anti-friction bearing devices 78 and 79, respectively.

These anti-friction bearing devices 78 and 79 consist of a plurality of roller bearing elements 80 and 81, respectively. The adjacent roller bearing elements 80 of the anti-friction bearing device 78 are connected by means of links 82, through which a reduced diameter portion 83 of the roller bearing elements 80 extends. The interconnection of the roller bearing elements 80 by means of the links 82 provides a continuous chain of lineally interconnected roller bearing members which may extend longitudinally along the runway 76 positioned upon the platform 72 of the carriage bracket 35. Pulley 84 is pivotally mounted upon bearings 85 over which the continuous chain of anti-friction roller bearing elements extend. One of these pulleys 84 is mounted adjacent each end of the runway 76 and provides means for tensioning the continuous chain of anti-friction bearing devices along the runway 76, and provides sufficient tension to retain the slack out of the portion of the chain 78 which extends through the cored passage 74 within the carriage bracket 35.

A similarly constructed continuous chain of anti-friction roller bearing elements 81 comprise the chain 79, adjacent bearing elements being interconnected by means of the links 86 through which the reduced end portions 87 of the bearing elements 81 extend. The interconnecting links 82 and 86 are of greater dimensional width than the diameter of the roller bearings 80 and 81, respectively, whereby the inner edges of the links 82 and 86 will cooperate with the runways 76 and 77 to provide means to guide the anti-friction bearing chains 78 and 79 longitudinally along the runways 76 and 77.

The slide 40 is positioned within the recess 73 provided between walls 70 and 71 of the carriage bracket 35 and is provided with downwardly extending runways 90 and 91 which rest upon the anti-friction roller bearing chains 78 and 79, respectively, whereby the roller bearing chains receive the vertical thrust of the slide 40. The interconnecting links 82 and 86 of the anti-friction roller bearing chains 78 and 79 are also adapted to engage the walls of the runways 90 and 91, whereby the chains 78 and 79 are also guided in their longitudinal movement with respect to the runways 90 and 91 in the same manner as with respect to runways 76 and 77.

The slide 40 is provided with a guideway 92 which extends downwardly from the bottom surface of the slide 40 and is in parallel relation with the runways 90 and 91 of the slide and with the runways 76 and 77 of the carriage bracket 35. A plurality of anti-friction bearing devices 95, each consisting of a multiplicity of rotary bearing elements, are mounted upon an insert or gib 96 and are arranged adjacent a vertical wall 97 of the guideway 92. A similar set of anti-friction bearing elements 98, each consisting of a multiplicity of rotary bearing elements, is mounted upon the gib 99 and is positioned adjacent the vertical wall 100 of the guideway 92. The gibs 96 and 99 are mounted within suitable recesses in the platform 72, the gib 99 being secured by means of bolts 101 while the gib 96 is adjustably positioned within the recess 102 by means of adjusting screws 103 and 104 positioned at opposite ends of the gib 96, and which are in threaded engagement with the platform 72. The gib 96 is provided with a tapered wall which cooperates with a correspondingly tapered wall of the platform 72 as at 105, whereby adjustment of the screws 103 and 104 will cause the gib to move transversely upon the platform 72 to adjust the working clearance between the anti-friction bearing devices 95 and 98 and the guideway 92. These anti-friction bearing devices 95 and 98 are mounted with their rotational axes in a vertical position whereby the bearing faces cooperate with the vertical walls 97 and 100 of the guideway 92 to absorb the transverse thrust of the slide 40 when operated with respect to the carriage bracket 25.

The swivel 50, as has heretofore been described, is pivotally mounted upon the slide 40 by means of the pin 51. The swivel 50 has the upwardly extending guideway 61 which cooperates with a plurality of anti-friction bearing devices 111, each of which consists of a multiplicity of rotary bearing elements, mounted upon the shoe 60 to provide a substantially frictionless movement between the shoe 60 and the swivel guideway 61.

The draw-bar 64 is slidingly mounted within the brackets 112 and 113 which extend upwardly from the carriage bracket 35, and are provided with a channel shaped recess in which the drawbar 64 may operate transversely to the carriage bracket 35. A cover plate 114 is positioned adjacent the draw-bar 64 and is secured to the brackets 112 and 113 by means of the bolts 115, the cover plate 114 providing a closed recess within which the draw-bar 64 may slide.

To provide added insurance that the slide 40 will not lift vertical from the anti-friction roller bearing chains 78 and 79, I provide horizontally positioned gibs 116 which extend over opposite parallel edges of the slide 40.

In Figure 4, I have shown a modified arrangement of the positioning of the anti-friction bearing devices between the longitudinal guideway of the slide and the bearing mountings upon the carriage bracket. In Figure 4, there is shown an inversion of the bearing mountings wherein anti-friction bearing devices 120 and 121 are supported upon gibs 122 and 123, respectively. The gibs 122 and 123 are mounted within suitable recesses 124 and 125 positioned within the slide 40, whereby the anti-friction bearing devices 120 and 121 are mounted upon the slide 40 rather than upon the carriage bracket 35 as disclosed in Figure 2. A guideway 126 extends upwardly from the platform 72 of the carriage bracket 35, the anti-friction bearings 120 and 121 being adjacent to and cooperating therewith to guide the slide 40 longitudinally of the carriage bracket 35. The gib 122 may be adjustable in the same manner as the gib 96 of Figure 2.

In this figure I have also shown a modified arrangement of the anti-friction bearing device between the shoe 60a and the swivel 50a wherein the swivel 50a consists of a member substantially channel shaped in cross-section. The shoe 60a is adapted to be positioned within the recess portion of the shoe 50a and the anti-friction bearing devices 130, each consisting of a multiplicity of rotary bearing elements, being adapted to cooperate with the vertically extending walls of the channel shaped swivel 50a.

While the form of the invention as disclosed in this application shows a preferred form of the invention, yet it is desired to cover all modifications which fall within the scope of the claims.

Having thus fully described my invention, what I claim as new and desire to secure by Letters Patent is:

1. In a machine tool, a carriage bracket platform, a slide member movable with respect to said platform member, a longitudinally positioned guideway extending from one of said members, a plurality of ball bearing anti-friction devices positioned upon the other of said members and disposed on the opposite sides of said guideway to longitudinally guide said slide with respect to said platform, a longitudinally tapered recess in said other of said members, a longitudinally tapered wedge disposed in said recess and supporting said anti-friction devices on one side of said guideway, means for moving said wedge longitudinally in said recess to transversely move said anti-friction devices with respect to said guideway to adjust the clearance therebetween, and a continuous chain of roller bearing elements longitudinally encircling said platform and disposed between said slide and said platform to vertically support said slide upon said platform.

2. A bearing adjustment for taper attachment for a machine tool having a bracket member and a slide member relatively movable to each other, bearing means between adjacent faces of said members, a guideway in one of said members, a tapered recess in the other of said members, a wedge disposed in said recess, means for moving said wedge along said recess to transversely move said bearing means with respect to said guideway whereby to adjust the clearance between said members.

CLIFFORD A. BICKEL.